(12) United States Patent
Vaidyanathan et al.

(10) Patent No.: US 10,142,168 B2
(45) Date of Patent: Nov. 27, 2018

(54) TECHNOLOGIES FOR EVENT BASED DEBUGGING OF DATA CENTER SWITCHING

(71) Applicant: CISCO TECHNOLOGY, INC., San Jose, CA (US)

(72) Inventors: Ramanan Vaidyanathan, San Jose, CA (US); Ajay Modi, San Jose, CA (US); Azeem Suleman, San Jose, CA (US); Krishna Doddapaneni, San Jose, CA (US); Sarang Dharmapurikar, San Jose, CA (US); Ganlin Wu, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 180 days.

(21) Appl. No.: 15/221,538

(22) Filed: Jul. 27, 2016

(65) Prior Publication Data

US 2018/0034686 A1 Feb. 1, 2018

(51) Int. Cl.
| | | |
|---|---|---|
| *H04L 12/24* | (2006.01) | |
| *H04L 29/06* | (2006.01) | |
| *H04L 12/947* | (2013.01) | |
| *H04B 17/17* | (2015.01) | |
| *G06F 11/07* | (2006.01) | |
| *H04L 12/26* | (2006.01) | |

(52) U.S. Cl.
CPC ...... *H04L 41/0677* (2013.01); *G06F 11/0709* (2013.01); *G06F 11/079* (2013.01); *G06F 11/0751* (2013.01); *G06F 11/0772* (2013.01); *H04B 17/17* (2015.01); *H04L 41/0873* (2013.01); *H04L 49/25* (2013.01); *H04L 69/16* (2013.01); *H04L 69/22* (2013.01); *H04L 43/08* (2013.01)

(58) Field of Classification Search
CPC ............ G06F 11/0709; G06F 11/0751; G06F 11/0772; G06F 11/079; H04L 41/0677; H04L 41/0873; H04L 69/16; H04L 69/22; H04L 43/08
See application file for complete search history.

(56) References Cited

U.S. PATENT DOCUMENTS

| | | | |
|---|---|---|---|
| 2006/0153613 A1* | 7/2006 | Nemmaier | B41J 29/26 400/50 |
| 2008/0052394 A1* | 2/2008 | Bugenhagen | H04L 12/14 709/224 |
| 2016/0335145 A1* | 11/2016 | Toba | H03K 19/1776 |

* cited by examiner

*Primary Examiner* — Mewale Ambaye
(74) *Attorney, Agent, or Firm* — Polsinelli PC

(57) ABSTRACT

Systems, methods, and computer-readable media for improving debugging and troubleshooting of datacenter networks, and more particularly improving the speed of forwarding/data path related problems without going into ASIC level debugging. A switch could, for example, have a processor which communicates with an ASIC. The processor can receive flow information and a notification from the ASIC, the notification indicating a predefined error condition has been identified in a packet. The processor can modify the ASIC programming based on the notification, such that the ASIC records additional, more-detailed, flow information for the switch. The processor can then receive, from the modified ASIC, the additional flow information. The additional flow information can then be used (either by the processor or by an operator) to identify the exact reason for the errors in the flow path.

20 Claims, 6 Drawing Sheets

TECHNOLOGIES FOR EVENT BASED DEBUGGING OF DATA CENTER SWITCHING

TECHNICAL FIELD

The present technology pertains to network analytics, and more specifically to automatic debugging being initiated upon detection of packet level anomalies.

BACKGROUND

Data center networks can have a large number of switches and traffic volume, which presents a unique challenge of debugging and troubleshooting. For example, if a packet is dropped by a series of switches, it can be difficult to determine where and why the packet was dropped. Traditional debugging tools, such as SPAN (Switched Port Analyzer) and ERSPAN (Encapsulated Remote Switched Port Analyzer) can be used to debug dropped packets, but these tools fail to provide any insight into the states of ASICs (Application Specific Integrated Circuits) which are often the root causes of the problem. The MICROSOFT EVERFLOW platform (which is based on ERSPAN) can be used to debug anomalies in TCP flows and packet drops, but requires an external server and significant fabric bandwidth while again failing to provide any insight into ASIC states.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to improve debugging and troubleshooting of datacenter networks by increasing the speed of debugging processes while not going into ASIC level debugging.

Disclosed are systems, methods, and computer-readable storage media for event based debugging which can help identify packet level anomalies such as forwarding and buffer drops. Additionally, the methods, systems, and computer-readable storage media disclosed herein can provide ASIC state information which can be used to root out the cause of the problems. A network device (e.g., a Layer 2 or Layer 3 networking device) can, for example, have a processor which communicates with an ASIC. The processor can receive flow information and a notification from the ASIC, where the notification indicates a predefined error condition has been identified in a packet associated with the flow information. More specifically, the notification received from the ASIC can indicate how the predefined error symptom was identified within the flow information. The software running on the processor can act on this information by modifying the ASIC state such that the ASIC captures finer-level state information. This finer-level state information in turn can allow the processor to identify the reason for the error.

Description

Figure 1:
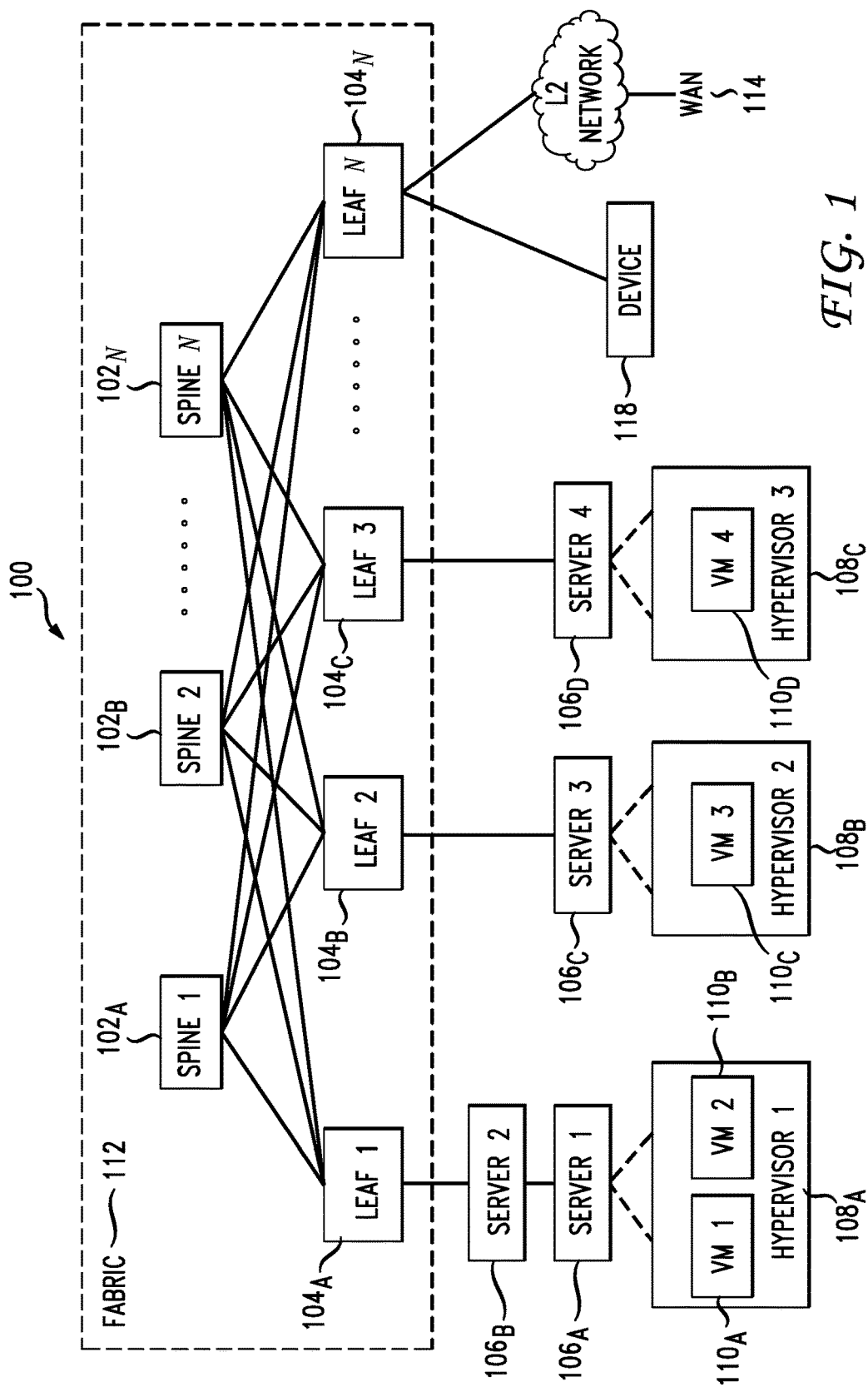
FIG. 1 illustrates a diagram of an example network environment.

The disclosed technology addresses the need in the art for improved event based debugging. Disclosed are systems, methods, and computer-readable storage media/devices which improve network device debugging by modifying an ASIC when certain conditions are present such that the network device CPU receives specific information from the modified ASIC. A description of an example network environment, as illustrated in FIG. 1, is first disclosed herein. A discussion of a network device (such as a switch) will then follow in FIG. 2. The discussion continues with a description of how communications within a network device flow. The discussion then continues with a description of example devices, as illustrated in 4A and 4B, as well as a description of an exemplary method embodiment. These variations shall be described herein as the various examples are set forth. The disclosure now turns to FIG. 1.

FIG. 1 illustrates a diagram of example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-5 ($106_{A-E}$) (collectively "106"), hypervisors 1-4 ($108_A$-$108_D$) (collectively "108"), and virtual machines (VMs) 1-5 ($110_A$-$110_E$) (collectively "110") access to fabric 112. For example, leaf routers 104 can encapsulate and decapsulate packets to and from servers 106 in order to enable communications throughout environment 100. Leaf routers 104 can also connect other devices, such as device 114, with fabric 112. Device 114 can be any network-capable device(s) or network(s), such as a firewall, a database, a server, devices 118, etc. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106c$ and hypervisor $108_B$. Servers 106 can similarly be migrated to other locations in network environment 100. For example, a server connected to a specific leaf router can be changed to connect to a different or additional leaf router. In some cases, some or all of servers 106, hypervisors 108, and/or VMs 110 can represent tenant space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Servers 106 can execute and host one or more VMs $110_{A-N}$ (collectively "110"). VMs 110 can be configured to run workloads (e.g., applications, services, processes, functions, etc.) based on hardware resources on server $106_A$. VMs 110 can run on guest operating systems on a virtual operating platform provided by hypervisor $108_A$. Each VM 110 can run a respective guest operating system which can be the same or different as other guest operating systems associated with other VMs 110 on server $106_A$. Each of guest operating systems can execute one or more processes, which may in turn be programs, applications, modules, drivers, services, widgets, etc. Moreover, each VM 110 can have one or more network addresses, such as an internet protocol (IP) address. VMs 110 can thus communicate with hypervisor $108_A$, server $106_A$, and/or any remote devices or networks using the one or more network addresses.

Hypervisor $108_A$ (otherwise known as a virtual machine manager or monitor) can be a layer of software, firmware, and/or hardware that creates and runs VMs 110. Guest operating systems 204 running on VMs 110 can share virtualized hardware resources created by hypervisor $108_A$. The virtualized hardware resources can provide the illusion of separate hardware components. Moreover, the virtualized hardware resources can perform as physical hardware components (e.g., memory, storage, processor, network interface, peripherals, etc.), and can be driven by hardware resources on server $106_A$. Hypervisor $108_A$ can have one or more network addresses, such as an internet protocol (IP) address, to communicate with other devices, components, or networks. For example, hypervisor $108_A$ can have a dedicated IP address which it can use to communicate with VMs 110, server $106_A$, and/or any remote devices or networks.

Hardware resources of server $106_A$ can provide the underlying physical hardware that drive operations and functionalities provided by server $106_A$, hypervisor $108_A$, and VMs 110. Hardware resources can include, for example, one or more memory resources, one or more storage resources, one or more communication interfaces, one or more processors, one or more circuit boards, one or more buses, one or more extension cards, one or more power supplies, one or more antennas, one or more peripheral components, etc.

Server $106_A$ can also include one or more host operating systems (not shown). The number of host operating systems can vary by configuration. For example, some configurations can include a dual boot configuration that allows server $106_A$ to boot into one of multiple host operating systems. In other configurations, server $106_A$ may run a single host operating system. Host operating systems can run on hardware resources 210. In some cases, hypervisor $108_A$ can run on, or utilize, a host operating system on server $106_A$. Each of the host operating systems can execute one or more processes, which may be programs, applications, modules, drivers, services, widgets, etc.

Figure 2:
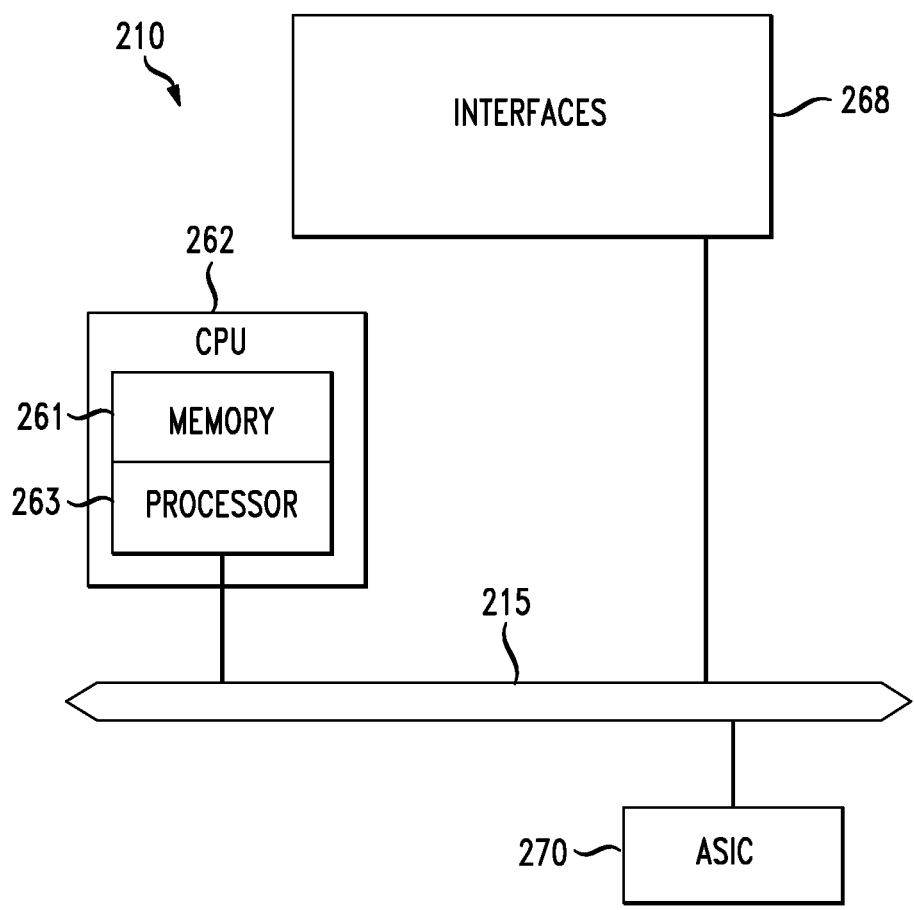
FIG. 2 illustrates an example network device.

FIG. 2 illustrates an example network device 210, such as those used to form the spine 102 of the fabric 112 illustrated in FIG. 1. Network device 210 includes a master central processing unit (CPU) 262, interfaces 268, and a bus 215 (e.g., a PCI bus). When acting under the control of appropriate software or firmware, the CPU 262 is responsible for executing packet management, error detection, and/or routing functions. The CPU 262 preferably accomplishes all these functions under the control of software including an operating system and any appropriate applications software. CPU 262 may include one or more processors 263 such as a processor from the MOTOROLA family of microprocessors or the MIPS family of microprocessors. In an alternative embodiment, processor 263 is specially designed hardware for controlling the operations of router 210. In a specific embodiment, a memory 261 (such as non-volatile RANI and/or ROM) also forms part of CPU 262. However, there are many different ways in which memory could be coupled to the system.

The interfaces 268 are typically provided as interface cards (sometimes referred to as "line cards"). Generally, they control the sending and receiving of data packets over the network (e.g., 100) and sometimes support other peripherals used with the network device 210. Among the interfaces that may be provided are Ethernet interfaces, frame relay interfaces, cable interfaces, DSL interfaces, fiber, token ring interfaces, and the like. In addition, various high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and/or memory such as volatile RAM. The independent processors may control such communications intensive tasks as packet switching, media control and management. By providing separate processors for the communications intensive tasks, these interfaces allow the master microprocessor 262 to efficiently perform routing computations, network diagnostics, security functions, etc.

Although the system shown in FIG. 2 is one example network device 210 of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 261) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

The example network device 210 also can have an ASIC 270 (Application Specific Integrated Circuit) which communicates with the CPU 262 and the interfaces 268 of the device 210 via the bus 215. ASICs can be used to improve device speed and data processing within the network device 210.

Figure 3:
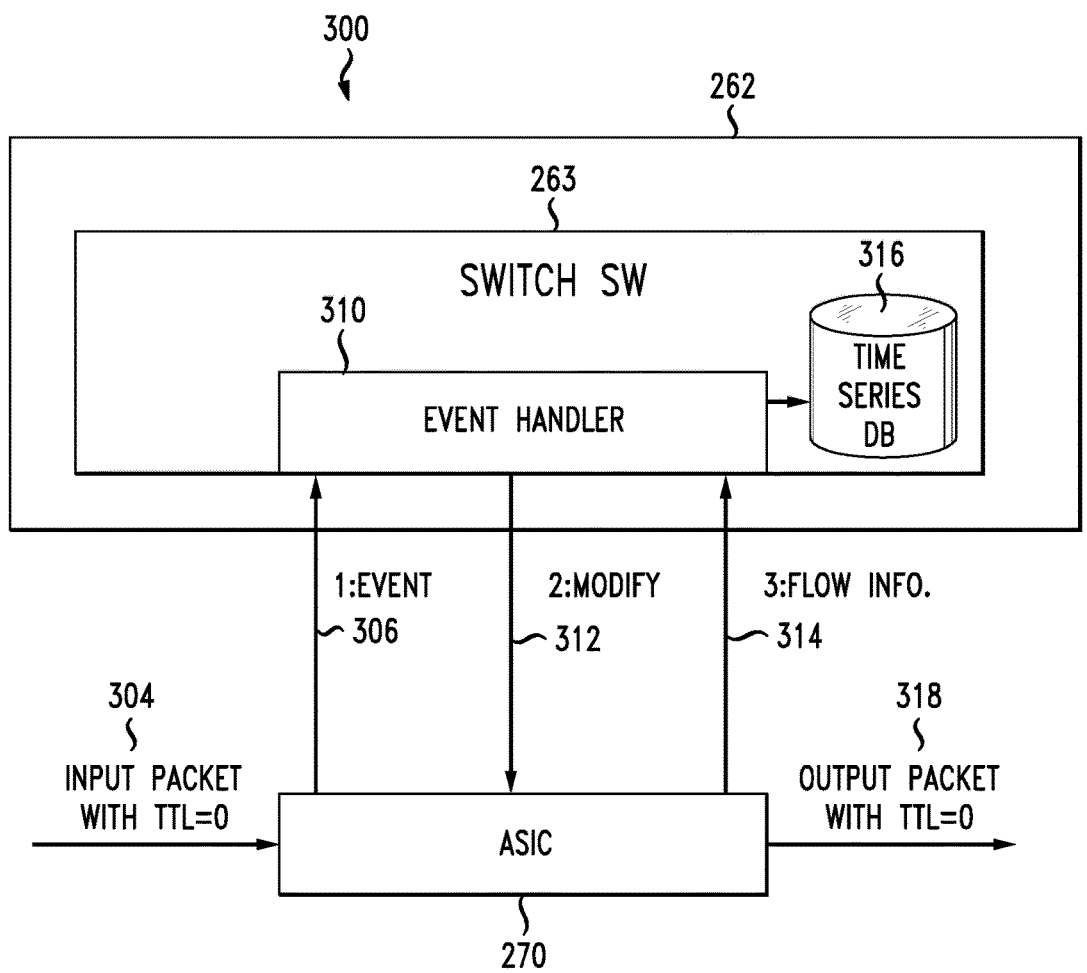
FIG. 3 illustrates an exemplary debugging exchange.

FIG. 3 illustrates an exemplary debugging exchange 300 of the device 210. The debugging techniques described herein help in identifying the packet level anomalies such as forwarding and buffer drops. Additionally, it can provide finer-level state information of the ASIC 270, which in turn can be used to identify the cause of the problem. These features can be deployed on a network device 210, such as a switch, as an always-on debug utility.

The device receives input packets 304 which the ASIC 270 recognizes as incorrect, and therefore the ASIC 270 recognizes an error has occurred or is occurring. As illustrated, the error is a network loop (such as when the packet is received with a TTL=0), however other exemplary errors in the packets can include:
Forwarding Drops
Buffer Drops
Bursting (such as more data than a pre-configured threshold value)
Latency (such as a delay greater than a pre-configured threshold value)

The input packets 304 are received by a programmable ASIC (Application-Specific Integrated Circuit) 270. Unlike traditional ASICs, a programmable ASIC 270 can be reprogrammed with new hardware-level code after it is already deployed via communications with a CPU 262. First, the reprogrammed ASIC 270 is tasked with directing/outputting packets 318 to their destination quickly and efficiently. Second, the ASIC 270 is tasked with identifying errors in the packets received 304.

When the ASIC 270 identifies an error, an event 306 is triggered, causing a notification of the error to be sent to the CPU 262. Within the processor 263 of the CPU 262, an event handler 310 receives the notification from the ASIC 270 along with flow information and, based on the notification, initiates a hardware-level modification 312 to the ASIC 270 to record finer-level (i.e., additional) flow information from the ASIC 270. This hardware-level modification to the ASIC 270 can, for example, take the form of arming an ELAM (Embedded Logic Analyzer Module) for certain ASICs. For other programmable ASICs, the hardware-level modifications can include similar modification such that the ASIC records finer-level flow information associated with the data 304 being received. Exemplary finer-level flow information can include:

5 tuples (Source IP, Destination IP, Source L4 PORT, Destination L4 PORT, and PROTOCOL)
Event Reason (e.g., the type of error condition)
Drop Information (e.g., a type of dropped packet, such as an acl_drop, policer_drop, buffer_drop, ids_drop, forward_drop)
TCP related fields (such as flags, seq/ack num)
Source/Destination Tunnel End Point (TEP)
Input/Output Port on which the packet was received
Input/Output class of the packets
L2/L4 payload length
Direction (Ingress/Egress)
TTL (Time to Live)
COS (Class of Service)
CPU copy/redirect
Span packet
Encapsulation type
Flow type
Ping of Death detection The event handler 310 associated with the CPU 262 identifies any additional (finer) flow information needed, and any possible hardware modifications within the ASIC 270 needed to obtain that additional flow information. For example, in one embodiment, this process could constitute arming the ELAM to obtain finer-level details of flow information from the ASIC (such as table entries being accessed, the decision path taken by the ASIC, and/or the current internal state of the ASIC which resulted in the anomaly detection). The CPU 262 then transmits the hardware modification instructions 312 to the ASIC 270. The ASIC 270 is then modified, such that the ASIC 270 begins capturing and transmitting the finer details of flow information 314 to the CPU 262, while at the same time the ASIC 270 continues outputting the packets 318. The CPU 262 receives the captured flow information 314 (including the original flow information plus the additional, finer, flow information) and records the data in a time series database 316. The CPU 262 can parse the flow information 314 and can take further action based on the event/error identified in the received packets. Consider the following examples for how the CPU 262 programs the ASIC 270 to record finer-level flow information.

For a Forwarding Drop error, exemplary finer-level flow information recorded by the ASIC 270 and stored within the time series database 316 can include the 5. Tuples (Source IP address, Destination IP address, Source L4 Port, Destination L4 Port, and Protocol) and the Direction of the packet. Additional information which the CPU 262 can program the ASIC 270 to record can include forwarding table lookup results, intermediate forwarding pipeline states, final forwarding results, and the exact drop reason(s). This information is then captured by the Software/CPU 262 and stored in the time series database 316.

For a Networking Loop (such as where TTL=0), the CPU 262 can program the ASIC to retrieve (for example) the complete forwarding state of the flow. This information would be captured and stored in the time series database 316, then used by the CPU 262 or a user to correlate information with other switches in the fabric 112, allowing the CPU 262 or user to identify a misconfiguration or a badly behaving switch.

For a buffer drop, the CPU 262 extracts the output port and output class from the flow information of the packet that was dropped, and can program the ASIC using a modified ElephantTrap (ETRAP), such that the ETRAP only captures flows that are destined to the output class/port identified. Output of the ASIC or ETRAP give the bandwidth of all of the flows that are going out on the identified output port/class, which is then captured by the software and stored in the time series database 316. In effect, this provides a real-time monitoring of an output class.

For burst data, where a flow experiences a burst which is greater than a pre-configured value, then an event is generated by the ASIC 270. The CPU 262 stores this information in the time series database 316, which can then be used along with buffer drop data and latency data to identify the exact application which is causing the packet drop.

For latency errors, an ingress switch (e.g., a Top-of-Rack (TOR) switch) can insert a timestamp tag (where the ASIC 270 can have the flexibility to set the arrival or departure timestamp). An egress switch can then calculate the latency as a difference between the current time and the ingress timestamp. An event 306 can be generated and a notification sent to the CPU 262 if the latency is more than the configured value. The CPU 262 can store flow information (both the "original" flow information received before modification of the ASIC and "additional" and/or finer-level flow information received after the modification of the ASIC) in the time series database 316 associated with this notification, which can in turn be analyzed by users or the CPU 262 to determine the cause of the latency. For latency checking, clock synchronization is necessary.

All of the different types of error events can be throttled using per-event type and/or per-flow type error counters. For purposes of debugging, these per-event/flow counters can be set to a minimum value (i.e., 1) such that when a single packet appears in the flow having that event characteristic, the event is triggered. If, for example, the minimum value of an error were set to five, it would take five packets having that type of error to trigger the event notification 306 being sent to the CPU 262. These throttling mechanisms can help ensure that the CPU 262 software is not overwhelmed. While sending the event notification 306 to the CPU 262, we can also apply a policer on the event notification 306 to ensure the debugging disclosed herein does not result in a DoS (Denial of Service) attack.

All of the captured events stored in the time series database 316 are recorded as a flow record. The flow record can include flow information from the ASIC from before the notification is received, as well as more detailed flow information from the ASIC after the notification is received and the ASIC modified. The hardware modification can modify the ASIC such that the original flow information continues to be provided to the CPU in an unmodified form while requiring the ASIC to provide additional finer-level details regarding the flow information. Alternatively, the hardware modification to the ASIC can modify how the ASIC provides the flow information, such that the flow information being communicated to the CPU from the ASIC contains the additional finer-level details of the flow. The software of the CPU 262 can add additional information, such as source/destination end-point group and tenant information, thereby allowing a user or the CPU 262 to relate the error information with application specific errors. The database 316 can therefore contain a complete picture of how the ASIC 270 was operating when the drop (or other error) occurred, allowing users (or the CPU 262) to determine where the error occurred and/or why the error occurred. This in turn can help the user to identify any misconfigurations present in the system.

By having this debugging information in the time series database 316, a user can identify a drop between two endpoint groups, along with all ASIC level debugging information. This in turn aides the user in fixing configuration/setup issues, without going into ASIC level debugging when it may not be necessary. Users can also identify the application which is operating in error by co-relating a burst/latency error with a buffer drop, which can lead to a re-configuration of a Quality of Service policy.

Figure 4:
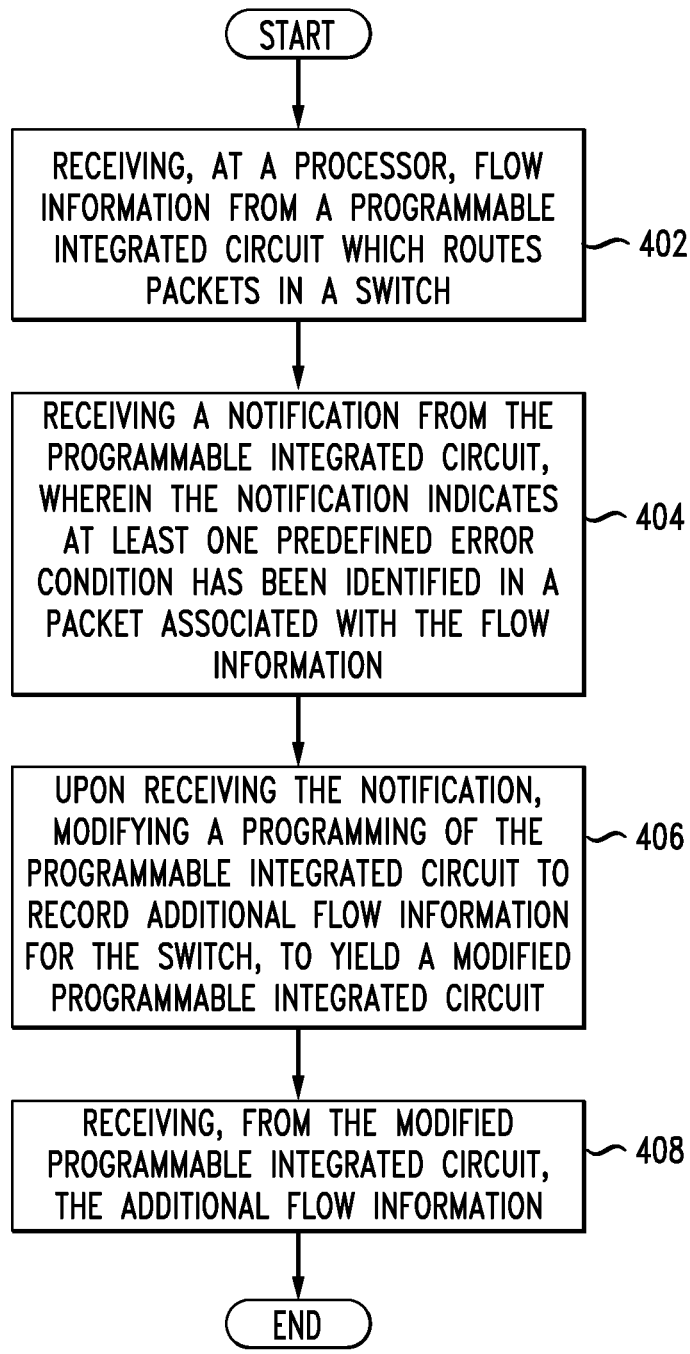
FIG. 4 illustrates an example method embodiment.

Having described the modification of the programmable ASIC 270 with respect to FIG. 3, we next consider the exemplary method embodiment of a CPU 262 on a network device 210 configured according to this disclosure, as illustrated in FIG. 4.

The CPU 262 receives flow information from a programmable integrated circuit which routes packets in a switch (402). The flow information indicates how data is being received and propagated through the programmable integrated circuit. An example of the programmable integrated circuit can, for example, include a programmable ASIC, where the hardware of the ASIC can be updated by the CPU 262. The CPU 262 also receives a notification from the programmable integrated circuit (404). The notification can indicate at least one predefined error condition has been identified in a packet. Upon receiving the notification, the CPU 262 modifies a programming of the programmable integrated circuit to record additional flow information for the switch, to yield a modified programmable integrated circuit (406). The CPU 262 then receives, from the modified programmable integrated circuit, the additional flow information (406). To prevent overloading the CPU 262 with data, the hardware modifications given can result in throttling on the modified programmable integrated circuit, such that how often the additional flow information is received by the CPU 262 is controlled The CPU 262 can receive the flow information (both the original and/or the additional flow information) as a User Datagram Protocol packet and store the data in a time-series database. The time series database can be contained within the switch, as part of the CPU 262 itself, or can be a remote database. The CPU 262 (or a user) can use the additional flow information recorded in the time-series database to identify a point of failure within the switch. In certain circumstances, this debugging process can utilize the data associated with multiple switches by combining the flow information (original and/or additional) with data from additional switches. Exemplary, non-limiting, errors which can be identified by the CPU 262 or a user based on the data include: a forwarding drop, a network loop, a buffer drop, a burst condition, and a latency condition.

Figure 5A:
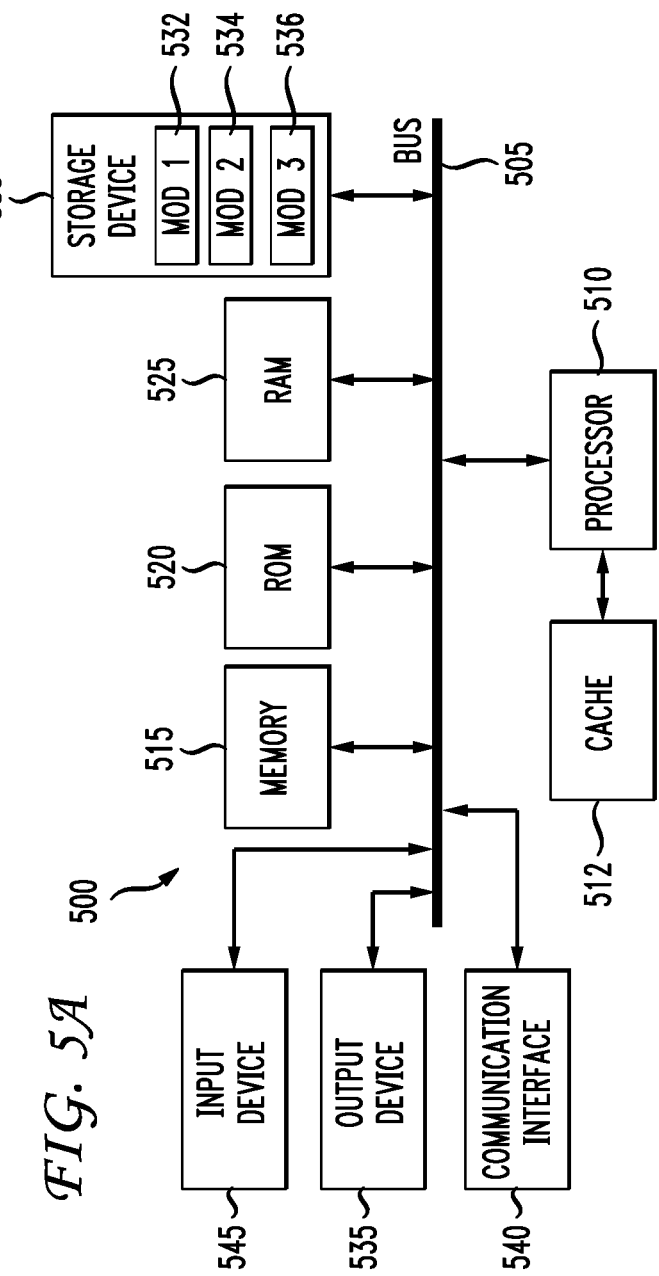
FIGS. 5A and 5B illustrate an example system embodiments.
Figure 5B:
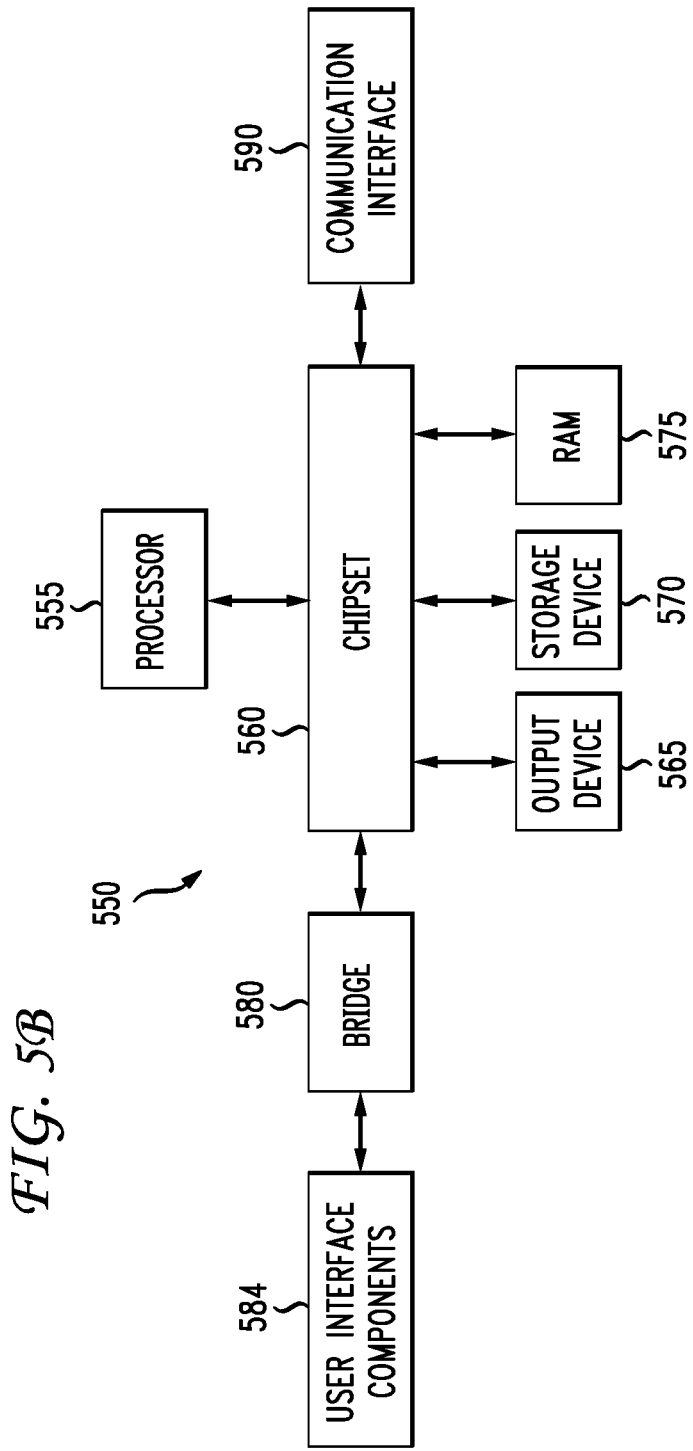

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 405. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   receiving, at a processor, flow information from a programmable integrated circuit which routes packets in a switch;
   receiving a notification from the programmable integrated circuit, wherein the notification indicates at least one predefined error condition has been identified in a packet associated with the flow information;
   upon receiving the notification, modifying a programming of the programmable integrated circuit to record additional flow information for the switch, to yield a modified programmable integrated circuit; and
   receiving, from the modified programmable integrated circuit, the additional flow information, wherein the flow information indicates how data is being received and propagated through the programmable integrated circuit.

2. The method of claim 1, wherein the programmable integrated circuit is a programmable Application-Specific Integrated Circuit.

3. The method of claim 1, wherein the flow information is received as a User Datagram Protocol packet.

4. The method of claim 1, further comprising:
   identifying a point of failure within the switch based on the additional flow information.

5. The method of claim 1, further comprising:
   storing the flow information and the additional flow information in a database.

6. The method of claim 5, further comprising:
   combining the flow information and the additional flow information with data from additional switches, to yield merged data; and
   performing an analysis on the merged data to identify a misconfiguration in the switch.

7. The method of claim 1, wherein the at least one predefined error condition comprises at least one of a forwarding drop, a network loop, and a buffer drop.

8. The method of claim 1, wherein the at least one predefined error condition comprises at least one of a burst condition and a latency condition.

9. The method of claim 1, wherein the modified programmable integrated circuit throttles data, thereby limiting how often the additional flow information is received.

10. A switch comprising:
    a programmable integrated circuit which routes packets;
    a processor; and
    a non-transitory computer-readable storage medium having instructions stored which, when executed by the processor, cause the processor to perform operations comprising:
    receiving flow information from a programmable integrated circuit which routes packets in a switch;
    receiving a notification from the programmable integrated circuit, wherein the notification indicates at least one predefined error condition has been identified in a packet associated with the flow information;
    upon receiving the notification, modifying a programming of the programmable integrated circuit to record additional flow information for the switch, to yield a modified programmable integrated circuit; and
    receiving, from the modified programmable integrated circuit, the additional flow information, wherein the flow information indicates how data is being received and propagated through the programmable integrated circuit.

11. The switch of claim 10, wherein the programmable integrated circuit is a programmable Application-Specific Integrated Circuit.

12. The switch of claim 10, wherein the flow information is received as a User Datagram Protocol packet.

13. The switch of claim 10, the computer-readable storage medium having additional instructions stored which, when executed by the processor, cause the processor to perform operations comprising:
identifying a point of failure within the switch based on the additional flow information.

14. The switch of claim 10, the computer-readable storage medium having additional instructions stored which, when executed by the processor, cause the processor to perform operations comprising:
storing the flow information and the additional flow information in a database.

15. The switch of claim 14, the computer-readable storage medium having additional instructions stored which, when executed by the processor, cause the processor to perform operations comprising:
identifying a misconfiguration in the switch by combining the flow information and the additional flow information with data from additional switches.

16. The switch of claim 10, wherein the at least one predefined error condition comprises at least one of a forwarding drop, a network loop, and a buffer drop.

17. The switch of claim 10, wherein the at least one predefined error condition comprises at least one of a burst condition and a latency condition.

18. The switch of claim 10, wherein the modified programmable integrated circuit throttles data, thereby limiting how often the additional flow information is received.

19. A Programmable Application-Specific Integrated Circuit configured to perform operations comprising:
identifying a predefined error condition within a packet, the packet having a designated destination;
forwarding the packet to the designated destination; sending flow information associated with the packet to a processor; sending a notification to the processor, wherein the notification informs the processor the predefined error condition was identified;
receiving from the processor reprogramming instructions; reconfiguring the Application-Specific Integrated Circuit according to the reprogramming instructions;
according to the reprogramming instructions, recording additional flow information for packets; and
transmitting the additional flow information to the processor, wherein the flow information indicates how data is being received and propagated through the programmable integrated circuit.

20. The programmable Application-Specific Integrated Circuit of claim 19, wherein the predefined error condition is one of a forwarding drop and a network loop.

* * * * *